United States Patent
Kim et al.

(10) Patent No.: US 11,760,309 B2
(45) Date of Patent: Sep. 19, 2023

(54) VEHICLE AND CONTROL METHOD THEREOF

(71) Applicants: Hyundai Motor Company, Seoul (KR); Kia Corporation, Seoul (KR)

(72) Inventors: Hyunsang Kim, Hwaseong-si (KR); Yun Sup Ann, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/710,052

(22) Filed: Mar. 31, 2022

(65) Prior Publication Data

US 2022/0388478 A1 Dec. 8, 2022

(30) Foreign Application Priority Data

Jun. 7, 2021 (KR) .......................... 10-2021-0073478

(51) Int. Cl.
*B60R 25/25* (2013.01)
*B60R 25/30* (2013.01)
*G07C 9/25* (2020.01)

(52) U.S. Cl.
CPC ............ *B60R 25/25* (2013.01); *B60R 25/252* (2013.01); *B60R 25/305* (2013.01); *G07C 9/253* (2020.01)

(58) Field of Classification Search
CPC ..... B60R 25/25; B60R 25/252; B60R 25/305; G07C 9/253
See application file for complete search history.

(56) References Cited

U.S. PATENT DOCUMENTS

| | | | |
|---|---|---|---|
| 10,964,215 B1* | 3/2021 | Papineau | G08G 1/146 |
| 2012/0170817 A1* | 7/2012 | Yang | G06V 20/59 |
| | | | 382/118 |
| 2017/0132663 A1* | 5/2017 | High | H04W 4/023 |
| 2019/0212732 A1* | 7/2019 | Takanashi | G05D 1/0027 |
| 2020/0139812 A1* | 5/2020 | Johnson | B60K 35/00 |
| 2020/0250445 A1* | 8/2020 | Papineau | G01S 5/0027 |
| 2021/0174065 A1* | 6/2021 | Kumagai | G06T 7/70 |

* cited by examiner

*Primary Examiner* — Thomas D Alunkal
(74) *Attorney, Agent, or Firm* — Slater Matsil, LLP

(57) ABSTRACT

An embodiment vehicle includes a display device, an input device configured to obtain an input of a user, a smart key identifying device configured to search for a smart key of a plurality of smart keys, and a controller electrically connected to the display device, the input device, and the smart key identifying device, wherein the controller is configured to control the smart key identifying device to search for the smart key located inside the vehicle based on receiving a first command for executing a face registration process through the input device and to determine whether to proceed with the face registration process based on how many of the plurality of smart keys are identified as being inside the vehicle.

20 Claims, 15 Drawing Sheets

VEHICLE AND CONTROL METHOD THEREOF

CROSS-REFERENCE TO RELATED APPLICATIONS

This application claims the benefit of Korean Patent Application No. 10-2021-0073478, filed on Jun. 7, 2021, which application is hereby incorporated herein by reference.

TECHNICAL FIELD

The disclosure relates to a vehicle and a control method thereof.

BACKGROUND

In order to improve user convenience, various systems for authenticating a driver are being applied to vehicles. For example, instead of an existing smart key system, a system for authenticating a driver using a smartphone or using biometric information such as face information is being applied to a vehicle.

In order to use a function of allowing access to a vehicle using face information, a driver needs to register his or her own face information. On the other hand, when another person other than an owner of the vehicle may arbitrarily register face information, there is a risk of vehicle theft and a problem in vehicle security may occur.

SUMMARY

The disclosure relates to a vehicle and control method thereof. Particular embodiments relate to a vehicle related to a technology for authenticating a user by using biometric information of the user, such as face information, and a control method thereof.

An embodiment of the disclosure provides a vehicle and a control method thereof capable of preventing face information used for locking or unlocking a vehicle from being arbitrarily registered by another person other than an owner of the vehicle.

Additional embodiments of the disclosure will be set forth in part in the description which follows and, in part, will be obvious from the description, or may be learned by practice of the disclosure.

In accordance with an embodiment of the disclosure, a vehicle includes a display device, an input device provided to obtain an input of a user, a smart key identifying device provided to search for a smart key, and a controller electrically connected to the display device, the input device, and the smart key identifying device, wherein the controller is provided to control the smart key identifying device to search for the smart key located inside the vehicle based on receiving a first command for executing a face registration process through the input device, and determine whether to proceed with the face registration process based on the number of the detected smart keys.

The controller may control the display device to output a first guide message instructing to possess a plurality of the smart keys based on a detection of the single smart key or a detection failure of the smart key.

The controller may control the display device to output a second guide message instructing a user action required to proceed with the face registration process based on a detection of the plurality of smart keys, and execute the face registration process in response to the user action.

The vehicle may further include a memory, and a camera provided on a door to photograph an exterior of the vehicle, wherein the controller may be provided to control the camera to obtain a face image of the user after outputting the second guide message, store the obtained face image of the user in the memory, and activate a face access function using the face image.

The controller may control the display device to output a failure message of the face registration based on a failure to obtain the face image.

The controller may control the display device to output a third guide message notifying that the face access function and a fingerprint starting function are available based on an activated state of the fingerprint starting function after the face access function is activated, or control the display device to output a fourth guide message guiding a setting of the fingerprint starting function based on an inactivated state of the fingerprint starting function after the face access function is activated.

The controller may control the display device to display a fingerprint setting menu based on receiving a setting start command of the fingerprint starting function through the input device after the fourth guide message is output.

The controller may control the smart key identifying device to search for the smart key located inside the vehicle based on receiving a command to inactivate the face access function or a command to delete the registered face information, and inactivate the face access function based on a detection of the at least one smart key.

The controller may control the display device to output a pop-up message instructing possession of the smart key based on the detection failure of the smart key after receiving the command to inactivate the face access function or the command to delete the registered face information.

The controller may control the display device to output a query message regarding whether to execute the command in response to reception of the inactivation command or the deletion command.

In accordance with another embodiment of the disclosure, a control method of a vehicle includes receiving a first command for executing a face registration process through an input device, searching for a smart key located inside the vehicle based on the first command, and determining whether to proceed with the face registration process based on the number of the detected smart keys.

The determining of whether to proceed with the face registration process may include outputting a first guide message instructing to possess a plurality of the smart keys through a display device based on a detection of the single smart key or a detection failure of the smart key.

The determining of whether to proceed with the face registration process may include outputting a second guide message instructing a user action required to proceed with the face registration process through the display device based on a detection of the plurality of smart keys, and executing the face registration process in response to the user action.

The executing of the face registration process may include obtaining a face image of a user using a camera after outputting the second guide message, storing the obtained face image of the user in a memory, and activating a face access function using the face image.

The obtaining of the face image of the user may include outputting a failure message of the face registration through the display device based on a failure to obtain the face image.

The control method may further include outputting a third guide message notifying that the face access function and a fingerprint starting function are available based on an activated state of the fingerprint starting function after the face access function is activated, or outputting a fourth guide message guiding a setting of the fingerprint starting function through the display device based on an inactivated state of the fingerprint starting function after the face access function is activated.

The control method may further include displaying a fingerprint setting menu through the display device based on receiving a setting start command of the fingerprint starting function through the input device after the fourth guide message is output.

The control method may further include searching for the smart key located inside the vehicle based on receiving a command to inactivate the face access function or a command to delete the registered face information, and inactivating the face access function based on a detection of the at least one smart key.

The searching of the smart key may include outputting a pop-up message instructing possession of the smart key through the display device based on the detection failure of the smart key.

The control method may further include outputting a query message regarding whether to execute the command through the display device in response to reception of the inactivation command or the deletion command.

BRIEF DESCRIPTION OF THE DRAWINGS

These and/or other aspects of embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
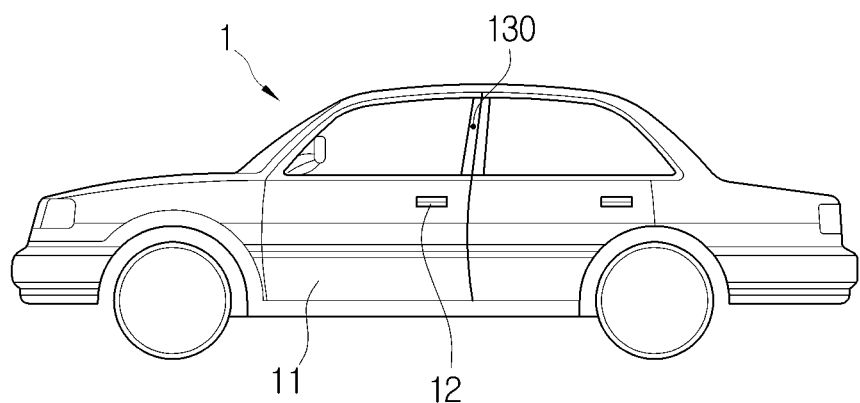
FIG. 1 illustrates an exterior of a vehicle according to an embodiment.

Throughout the specification, like reference numerals refer to like elements. This specification does not describe all the elements of the embodiments, and duplicative contents between general contents or embodiments in the technical field of the disclosure will be omitted.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The singular forms "a," "an," and "the" include plural referents unless the context clearly dictates otherwise.

Also, terms such as "~part," "~group," "~block," "~member," and "~module" may mean a unit for processing at least one function or operation. For example, the terms may mean at least one process processed by at least one hardware such as a field-programmable gate array (FPGA)/application specific integrated circuit (ASIC), at least one software stored in a memory, or a processor.

In each step, an identifying numeral is used for convenience of explanation, the identifying numeral does not describe the order of the steps, and each step may be performed differently from the order specified unless the context clearly states a particular order.

Hereinafter, embodiments related to a vehicle and a control method thereof will be described in detail with reference to the accompanying drawings.

FIG. 1 illustrates an exterior of a vehicle according to an embodiment.

Referring to FIG. 1, a vehicle 1 may include a door 11, a door handle 12 provided on the door 11, and a camera 130 provided on the door 11.

The door handle 12 refers to a handle provided on an outer surface of the door 11. The door handle 12 may be referred to as an outside handle. A handle button (not shown) for triggering locking or unlocking of the door 11 may be provided on the door handle 12. The handle button (not shown) may be provided as a push button or a touch button. The locking of the door 11 or the unlocking of the door 11 may be performed by a door locking device 110.

The camera 130 may be provided on the door 11. For example, the camera 130 may be provided on a door frame to cover a B-pillar of a vehicle frame. The B-pillar may be defined as a pillar provided between a front door and a rear door. The camera 130 need not be limited to being installed at a position of the door 11 corresponding to the B-pillar. The camera 130 may be installed at various locations inside an exterior of the vehicle 1 where a face image of a user may be obtained.

Figure 2:
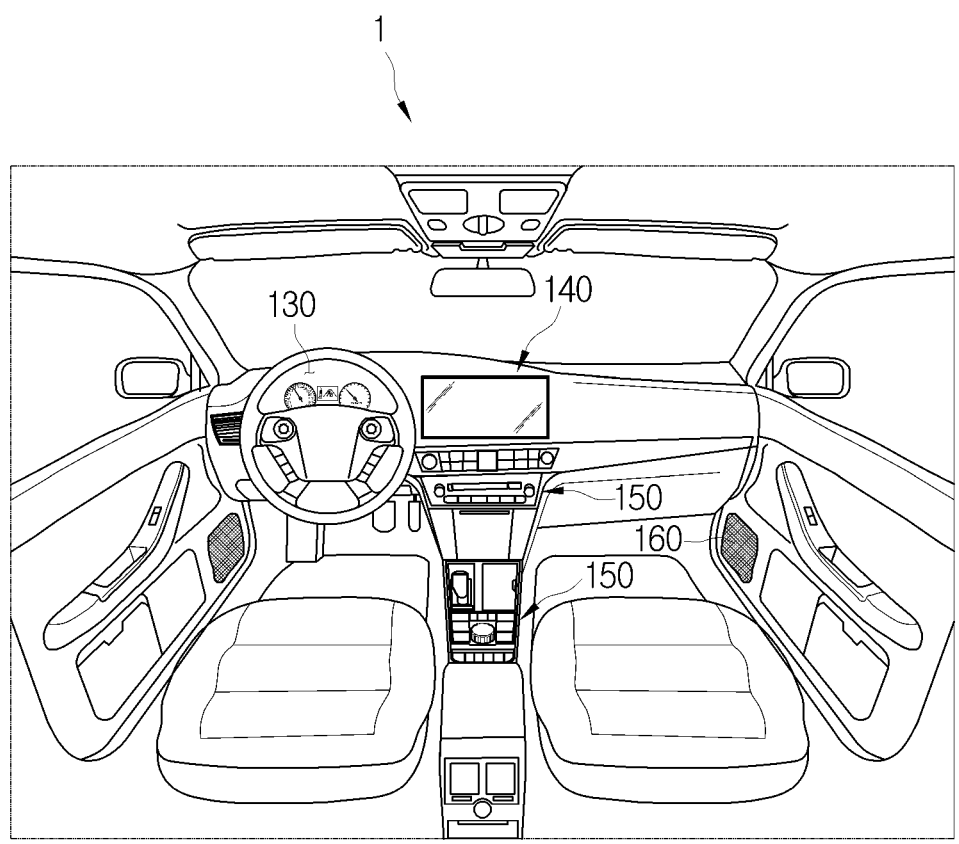
FIG. 2 illustrates an interior of the vehicle according to an embodiment.

FIG. 2 illustrates an interior of the vehicle according to an embodiment.

Referring to FIG. 2, an interior of the vehicle 1 may include a seat, a dashboard, and an instrument panel. The instrument panel (cluster) is disposed on the dashboard and may include various indicator lamps and warning lights. For example, the cluster may include a tachometer, a speedometer, a coolant thermometer, a fuel gauge, a turn indicator lamp, a high beam indicator lamp, a warning light, a seat belt warning light, a trochometer, an odometer, an automatic shift selector indicator lamp, a door open warning light, an engine oil warning light, and a fuel shortage warning light. Also, the cluster may be implemented digitally. The digitally implemented cluster may display vehicle status information and driving information as images and/or text.

The vehicle 1 may include a display device 140 and an input device 150. The display device 140 and the input device 150 may be provided at various locations inside the vehicle 1. For example, the display device 140 and the input device 150 may be provided in a center fascia. Also, the display device 140 may be provided in the cluster.

The display device 140 may output various information related to a function, state, and/or operation of the vehicle 1. The display device 140 may output a graphic user interface (GUI) including an object (e.g., icon, text, image) for executing or setting various functions of the vehicle 1. The graphical user interface (GUI) may interact with a user input. The display device 140 may output a screen corresponding to an input regarding the object.

The display device 140 may be a light emitting diode (LED) panel, an organic light emitting diode (OLED) panel, or a liquid crystal display (LCD) panel. The display device 140 may also include a touch screen.

The input device 150 may be provided on the center fascia, a head unit, and/or a steering wheel. The input device 150 may include buttons, dials, and/or touch pads related to the various functions of the vehicle 1. For example, the input device 150 may include a push button, a touch button, a touch pad, a touch screen, a dial, a stick-type operation device, and/or a track ball. The input device 150 may be provided integrally with the display device 140.

The vehicle 1 may include a sound device 160. At least one of the sound device 160 may be provided, and may be installed inside the dashboard and/or the door. A sound (e.g., a voice or a warning sound) related to the function, state, and/or operation of the vehicle 1 may be output through the sound device 160. The sound device 160 may include at least one speaker.

In addition, the vehicle 1 may include various devices for driving the vehicle 1. For example, the vehicle 1 may include a power generating device, a power transmitting device, a driving assistance device, a steering device, a brake device, an accelerator device, a suspension device, a transmission device, a fuel device, wheels and/or a battery. The vehicle 1 may also include a plurality of electronic components. For example, the vehicle 1 may include an electronic steering system, a body control module, and a driver assistance system.

The electronic components of the vehicle 1 may communicate with each other through the vehicle communication network. For example, the electronic components may transmit and receive data using a communication network such as Ethernet, MOST (Media Oriented Systems Transport), Flexray, CAN (Controller Area Network) and/or LIN (Local Interconnect Network).

Figure 3:
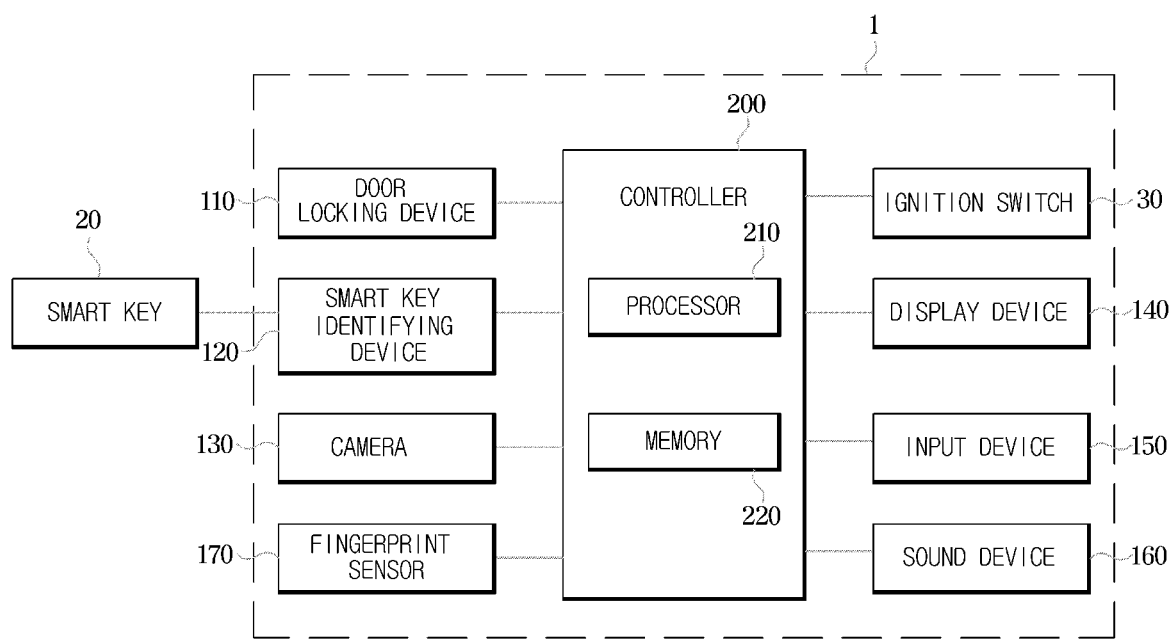
FIG. 3 is a control block diagram of the vehicle according to an embodiment.

FIG. 3 is a control block diagram of the vehicle according to an embodiment.

Referring to FIG. 3, the vehicle 1 may include an ignition switch 30, the door locking device 110, a smart key identifying device 120, the camera 130, the display device 140, the input device 150, the sound device 160, a fingerprint sensor 170, and a controller 200. The controller 200 may be electrically connected to devices provided in the vehicle 1 and may control the respective devices.

The ignition switch 30 serves as a starting switch to turn the starting of the vehicle 1 on and off. When the ignition switch 30 is turned on, the starting of the vehicle 1 is turned on, and when the ignition switch 30 is turned off, the starting of the vehicle 1 may be turned off. The controller 200 may turn on or off the starting of the vehicle 1 depending on the operation of the ignition switch 30.

The door locking device 110 may be provided inside the door 11 and may lock or unlock the door 11 under the control of the controller 200. For example, the controller 200 may control the door locking device 110 based on a locking or unlocking signal transmitted from a smart key 20 or a handle button (not shown).

The smart key identifying device 120 may communicate with the smart key 20 located inside or outside the vehicle 1. The smart key identifying device 120 may search for and identify the smart key 20 and may transmit a signal for locking or unlocking the vehicle 1 transmitted from the smart key 20 to the controller 200. The smart key identifying device 120 may also transmit a trunk opening or closing signal transmitted from the smart key 20 to the controller 200 and may transmit a starting signal of the vehicle 1 to the controller 200. The smart key identifying device 120 may generate a warning sound depending on the location of the smart key 20. The smart key 20 is a device such as a remote control capable of executing the various functions of the vehicle 1 and may be referred to as a key fob or fob.

One or more of the cameras 130 may be provided on the door 11. For example, the camera 130 may be provided on a door frame to cover the B-pillar of the vehicle frame. The camera 130 may include at least one image sensor and may photograph the exterior of the vehicle 1. For example, the camera 130 may obtain a face image of the user located outside the vehicle 1. When the user places a face within an angle of view of the camera 130 in front of the door 11 of the vehicle 1, the camera 130 may photograph the face of the user and obtain a face image.

The face image obtained by the camera 130 may be used for user authentication. The face image obtained by the camera 130 may also be used for face information registration. The controller 200 may compare the face image of the user obtained by the camera 130 with a pre-registered face image. When the obtained face image and the pre-registered face image match, the controller 200 may determine the success of user authentication. The controller 200 may determine the success of user authentication when the face image obtained by the camera 130 matches pre-registered face information, and may allow opening of the door 11. Conversely, when the face image obtained by the camera 130 does not match the pre-registered face information, the controller 200 may determine a failure of user authentication, and may prohibit opening of the door 11.

The display device 140 may output various pieces of information on the vehicle 1, the graphic user interface (GUI), and/or the screen. For example, the display device 140 may output a menu tree for face registration, a menu tree for fingerprint registration, a guide message related to a face registration process, a guide message related to a face access function, or a guide message related to a fingerprint starting function. The display device 140 may also display an indicator indicating a success of face registration or a failure of face registration.

The input device 150 may obtain a user input. The input device 150 may be provided integrally with the display device 140. For example, the user may input a first command (face registration command) for executing the face registration process by manipulating the input device 150. In addition, by manipulating the input device 150, the user may input an activation command or inactivation command of the face access function, may input an activation command or inactivation command of the fingerprint starting function, and may input a deletion command of the registered face information.

The sound device 160 may output a sound (e.g., a voice, a warning sound) related to the function, state, and/or operation of the vehicle 1. For example, the controller 200 may control the sound device 160 to output the guide message related to the face registration process, the guide message related to the face access function or the guide message related to the fingerprint starting function by voice.

The fingerprint sensor 170 may detect a fingerprint of the user. When the user touches the fingerprint sensor 170 with a finger, the fingerprint sensor 170 may obtain fingerprint information. The fingerprint information may be transmitted to the controller 200 and may be used for the user authentication and starting of the vehicle 1. When the fingerprint obtained by the fingerprint sensor 170 matches pre-registered fingerprint information, the controller 200 may determine the success of user authentication and may allow the starting of the vehicle 1. Conversely, when the fingerprint obtained by the fingerprint sensor 170 does not match the pre-registered fingerprint information, the controller 200 may determine the failure of user authentication and prohibit the starting of the vehicle 1.

The fingerprint sensor 170 may include at least one of a capacitive sensor for detecting a difference in capacitance depending on curvatures of a fingerprint, an optical sensor for detecting curvatures of a fingerprint depending on a shadow of the reflected light after outputting a light source, and an ultrasonic sensor for scanning microscopic features of an epidermal layer of skin. The fingerprint sensor 170 may be provided in the ignition switch 30.

The controller 200 may be electrically connected to the electronic devices of the vehicle 1 to control the respective devices. The controller 200 may include a processor 210 and a memory 220. The memory 220 may store a program, an instruction, and/or an application for performing a vehicle remote control method. The processor 210 may execute the program, the instruction, and/or the application stored in the memory 220. A plurality of the processors 210 and the memories 220 may be provided. The controller 200 may include control units such as an electronic control unit (ECU) and a micro controller unit (MCU).

The memory 220 may include a non-volatile memory device such as a cache, a ROM (read only memory), a PROM (programmable ROM), an EPROM (erasable programmable ROM), an EEPROM (electrically erasable programmable ROM), and a flash memory. Also, the memory 220 may include a volatile memory device such as a RAM (random access memory) and may include a storage medium such as a HDD (hard disk drive) and a CD-ROM. However, the type of the memory 220 is not limited to what is illustrated.

In addition to the above-described components, the vehicle 1 may include various devices. Also, some of the above-described components may be removed from the vehicle 1. Hereinafter, an operation of a vehicle control system according to an embodiment will be described in detail.

Figure 4:
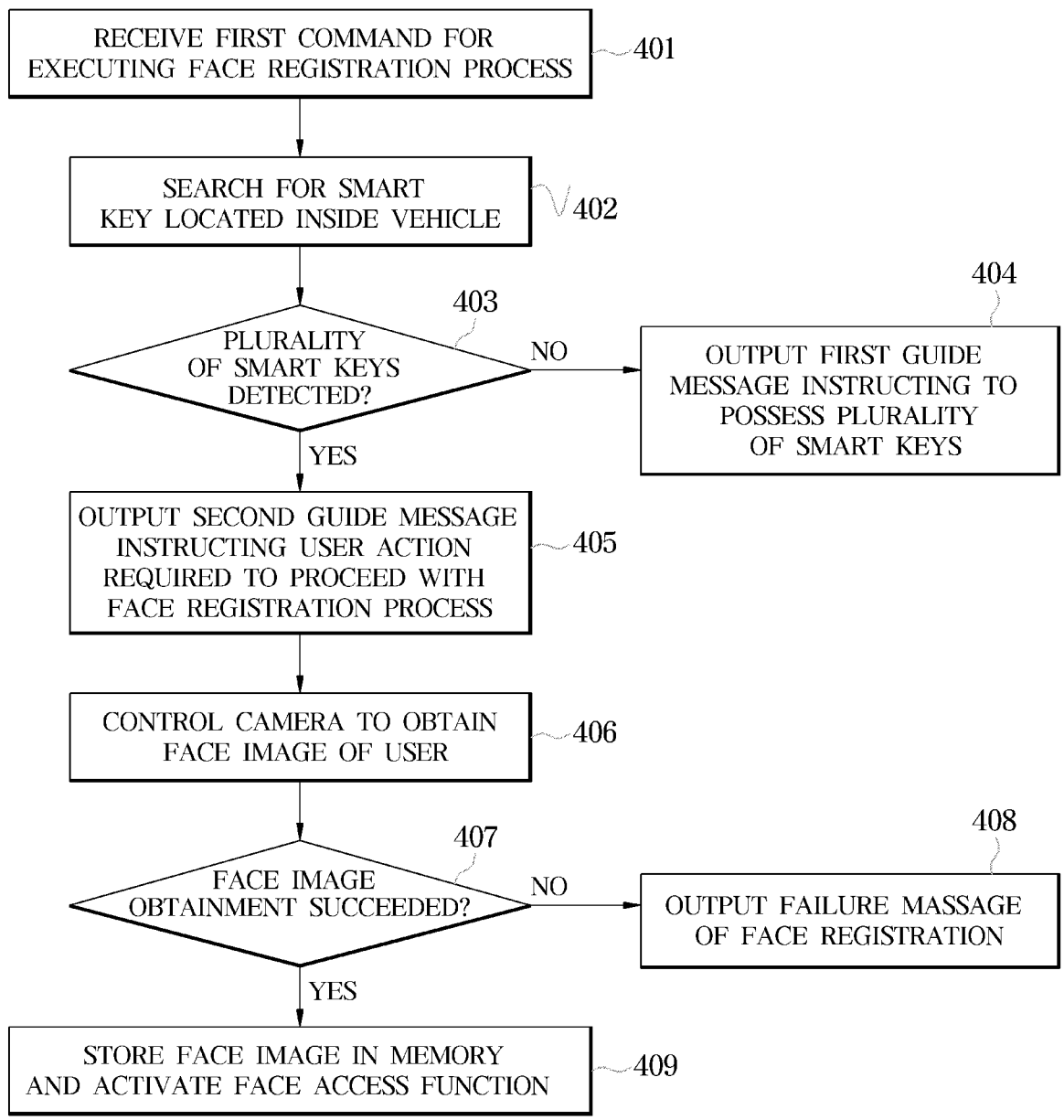
FIGS. 4, 5, and 6 are flowcharts for explaining a control method of the vehicle according to an embodiment.
Figure 5:
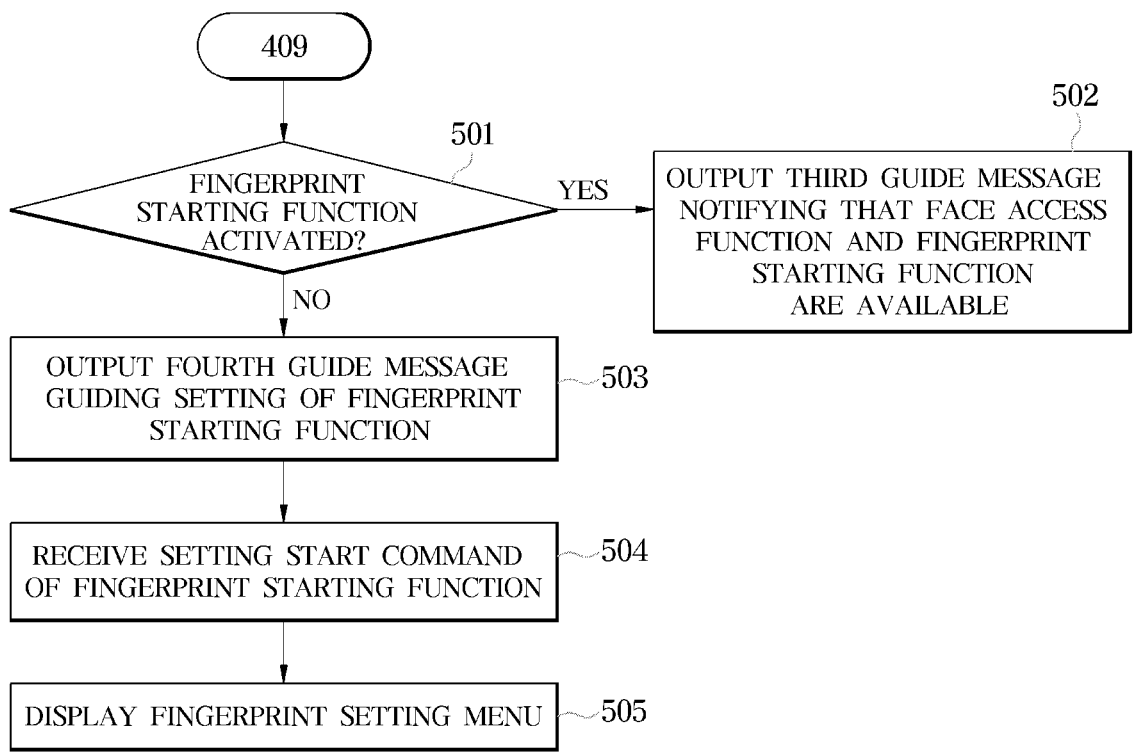
Figure 6:
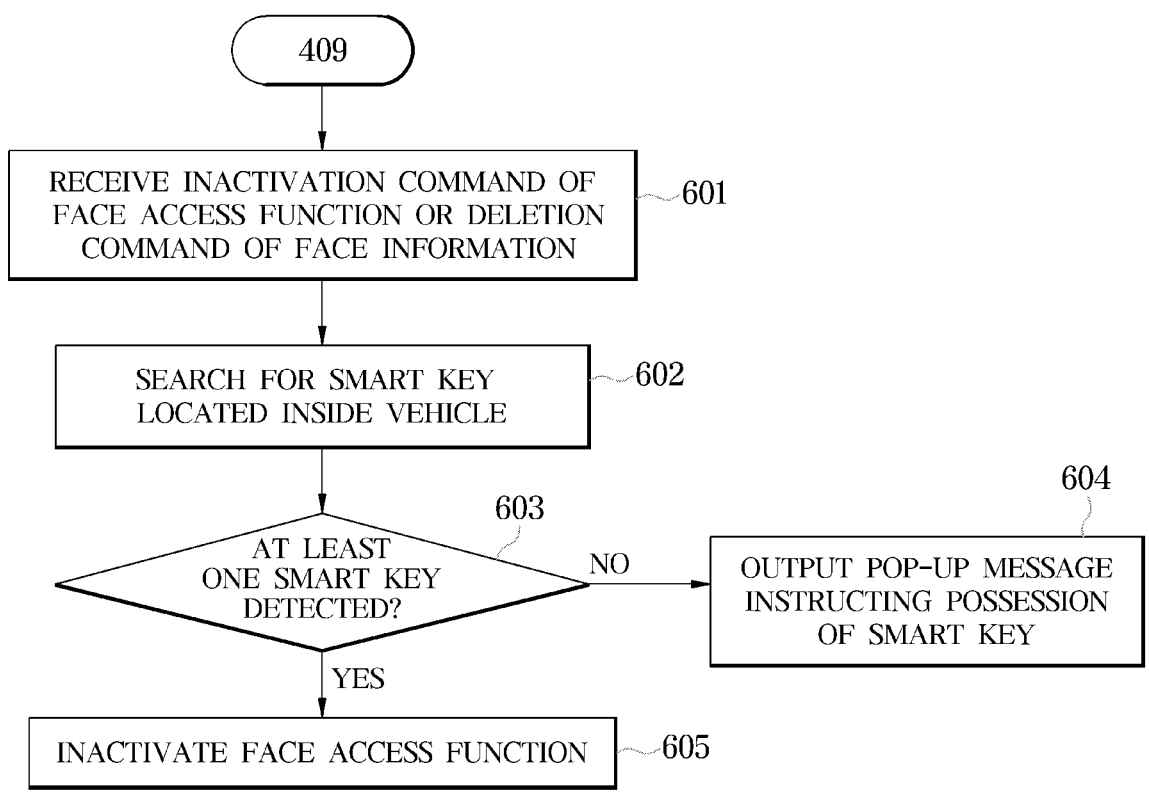

FIGS. 4, 5, and 6 are flowcharts for explaining a control method of the vehicle according to an embodiment.

Referring to FIG. 4, the controller 200 may receive the first command (face registration command) for executing the face registration process through the input device 150 (401). For example, the face registration command may be input in response to a user input of pressing or clicking an Add button 703*a* in the face registration menu displayed on the display device 140 (see, e.g., FIG. 7).

The controller 200 may control the smart key identifying device 120 to search for the smart key 20 located inside the vehicle 1 on the basis of receiving the first command (face registration command) for executing the face registration process (402). The controller 200 may determine whether to proceed with the face registration process based on the number of smart keys 20 detected by the smart key identifying device 120. The controller 200 may store the number of the detected smart keys 20 and identification numbers of the smart keys 20.

The controller 200 may control the display device 140 to output the first guide message instructing to possess a plurality of the smart keys 20 based on the detection of the single smart key 20 or a detection failure of the smart key 20 (403 and 404). For example, the first guide message may include a text such as 'Please proceed with face registration while possessing both of the two smart keys for security'.

In general, when the vehicle 1 is purchased, the two smart keys 20 are provided to the vehicle owner. When the vehicle 1 is driven, only the one smart key 20 is required, and the other one is kept separately. When the vehicle 1 is driven by another person (e.g., a surrogate driving situation and a valet parking situation), only the one smart key 20 is provided to the other person. When face information related to the security of the vehicle 1 is to be registered, by requiring both of the two smart keys 20 to be possessed, another person who possesses only the one smart key 20 may be prevented from registering face information.

The controller 200 may control the display device 140 to output the second guide message instructing the user action required to proceed with the face registration process based on the detection of the plurality of the smart keys 20 (405). For example, the second guide message may include texts such as 'To start face registration, please gaze straight at the camera installed on the B-pillar between the front door and the rear door. Then please follow the instructions with the driver's door open'.

The controller 200 may execute the face registration process in response to the user action. For example, the user action may include the movement of the user to position the face of the user within the angle of view of the camera 130. When the face image of the user is obtained by the camera 130, the controller 200 may proceed with the face registration process.

The controller 200 may control the camera 130 to obtain the face image of the user after outputting the second guide message (406). The controller 200 may control the display device 140 to output a face registration failure message (408) based on an obtainment failure of the face image (NO to 407). For example, after the second guide message is output, when the user does not gaze straight at the camera 130 or when the face of the user is not located within the angle of view of the camera 130 within a predetermined time, the controller 200 may determine the obtainment failure of the face image. The failure message may contain a text such as 'face registration failed'.

When the face image is successfully obtained (YES to 407), the controller 200 may store the obtained face image of the user in the memory 220 and may activate the face access function using the face image (409). The face access function may be defined as a function of allowing or prohibiting access to the vehicle 1 through face recognition. After the face information is registered, when the face image obtained by the camera 130 matches the pre-registered face information, the controller 200 may determine the success of user authentication and allow the opening of the door 11. Conversely, when the face image obtained by the camera 130 does not match the pre-registered face information, the controller 200 may determine the failure of user authentication and prohibit the opening of the door 11.

Referring to FIG. 5, the controller 200 may identify whether the fingerprint starting function is activated (501). The fingerprint starting function may be defined as a function of performing the starting the vehicle 1 using the fingerprint information of the user. By using the fingerprint starting function, the user may turn on the starting of the vehicle 1 even when the user does not possess the smart key 20.

When the fingerprint obtained by the fingerprint sensor 170 matches the pre-registered fingerprint information, the controller 200 may determine the success of user authentication and allow the starting of the vehicle 1.

The controller 200 may control the display device 140 to output a third guide message notifying that the face access function and the fingerprint starting function are available based on an activated state of the fingerprint starting function after the face access function is activated (502). For example, the third guide message may include texts such as 'Face registration was successful. The face access function may be used. The fingerprint starting function is set, and thus starting may be turned on through fingerprint recognition'.

Conversely, the controller 200 may control the display device 140 to output a fourth guide message guiding a setting of the fingerprint starting function based on an inactivated state of the fingerprint starting function after the face access function is activated (503). For example, the fourth guide message may include texts such as 'Face registration was successful. The face access function is available, but the fingerprint starting function is not set. Do you want to set the fingerprint starting function?'.

By outputting a message guiding the setting of the fingerprint starting function, the user may be induced to set the fingerprint starting function. Later, when the user is to start the vehicle 1 without possessing the smart key 20, a situation in which the starting of the vehicle 1 may not be turned on due to inactivation of the fingerprint starting function may be prevented.

After the fourth guide message is output, based on receiving a setting start command of the fingerprint starting function through the input device 150 (504), the controller 200 may control the display device 140 to display a fingerprint setting menu (505).

Referring to FIG. 6, the controller 200 may receive the inactivation command of the face access function or the deletion command of the registered face information through the input device 150 (601). The controller 200 may control the smart key identifying device 120 to search for the smart key 20 located inside the vehicle 1 based on the inactivation command of the face access function or the deletion command of the registered face information (602).

The controller 200 may control the display device 140 to output a query message regarding whether a command is executed in response to the inactivation command of the face access function or the deletion command of the registered face information. For example, the query message may include texts such as 'The face access function is canceled. Do you want to continue?' and 'When the 'face information is deleted, the face access function is canceled. Do you want to delete the face information?'.

The controller 200 may control the display device 140 to output a pop-up message instructing possession of the smart key 20 based on the detection failure of the smart key 20 (603 and 604). For example, the pop-up message may include texts such as 'To cancel the face access function, please possess the smart key.' and 'To delete the face information, please possess the smart key'.

The controller 200 may inactivate the face access function based on the detection of the at least one smart key 20 (603 and 605). When the face access function is inactivated, the face information is not used in determining whether to lock the vehicle 1.

When a driver whose face information is not registered operates the vehicle 1 with permission from the vehicle owner, the driver should be able to lock the vehicle 1 without face identification after the operation of the vehicle 1 is completed. By allowing the face access function to be canceled even when only the one smart key 20 is possessed, driver convenience may be secured.

Also, even when the user is to delete the unnecessary face information, by allowing the face information to be deleted even when only the one smart key 20 is possessed, user convenience may be secured. When the face information is deleted, the face access function may be automatically inactivated.

The messages output through the display device 140 described with respect to FIGS. 4, 5 and 6 may be output through the sound device 160.

Figure 7:
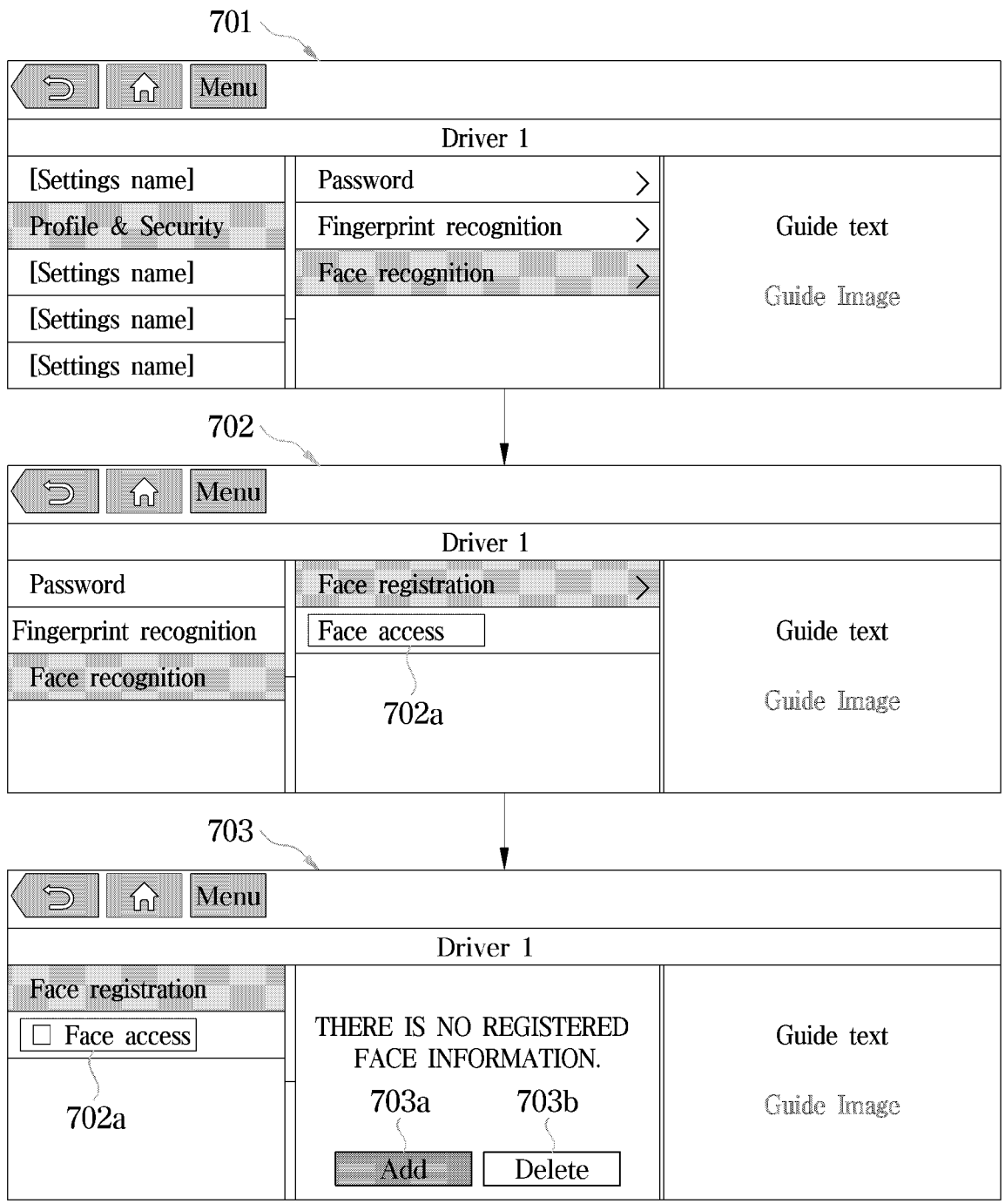
FIG. 7 illustrates an example in which a menu tree for face registration is displayed on a display device.

FIG. 7 illustrates an example in which a menu tree for face registration is displayed on a display device.

Referring to FIG. 7, a menu tree for face registration may be sequentially displayed on the display device 140 in response to a user input. The menu tree for face registration may be referred to as a face registration menu. An object of the graphical user interface (GUI) displayed on the display device 140 may interact with the user input. The object of the graphical user interface (GUI) may include an icon, text and/or an image. The user may touch the display device 140 or manipulate the input device 150 to select the object of the graphical user interface (GUI).

For example, a first screen 701, a second screen 702, and a third screen 703 may be sequentially displayed in response to a user input. On the first screen 701, when the user selects 'Profile & Security', password, fingerprint recognition, and face recognition may be displayed as submenus. When the user selects 'face recognition', the second screen 702 including the face registration and a face access 702a as a submenu related to the face recognition may be displayed on the display device 140. Also, when the user selects 'face registration', the third screen 703 including the Add button 703a capable of inputting the face registration command and a Delete button 703*b* capable of inputting the face information deletion command may be displayed on the display device 140.

The controller 200 may activate the face access function or inactivate the face access function based on a user input for the object of the face access 702*a*. A color and/or shape of a check box in the face access 702*a* item may be changed depending on the activation or inactivation of the face access function. Also, a user input for the Add button 703*a* may be defined as an input of the first command (face registration command) for executing the face registration process.

Figure 8:
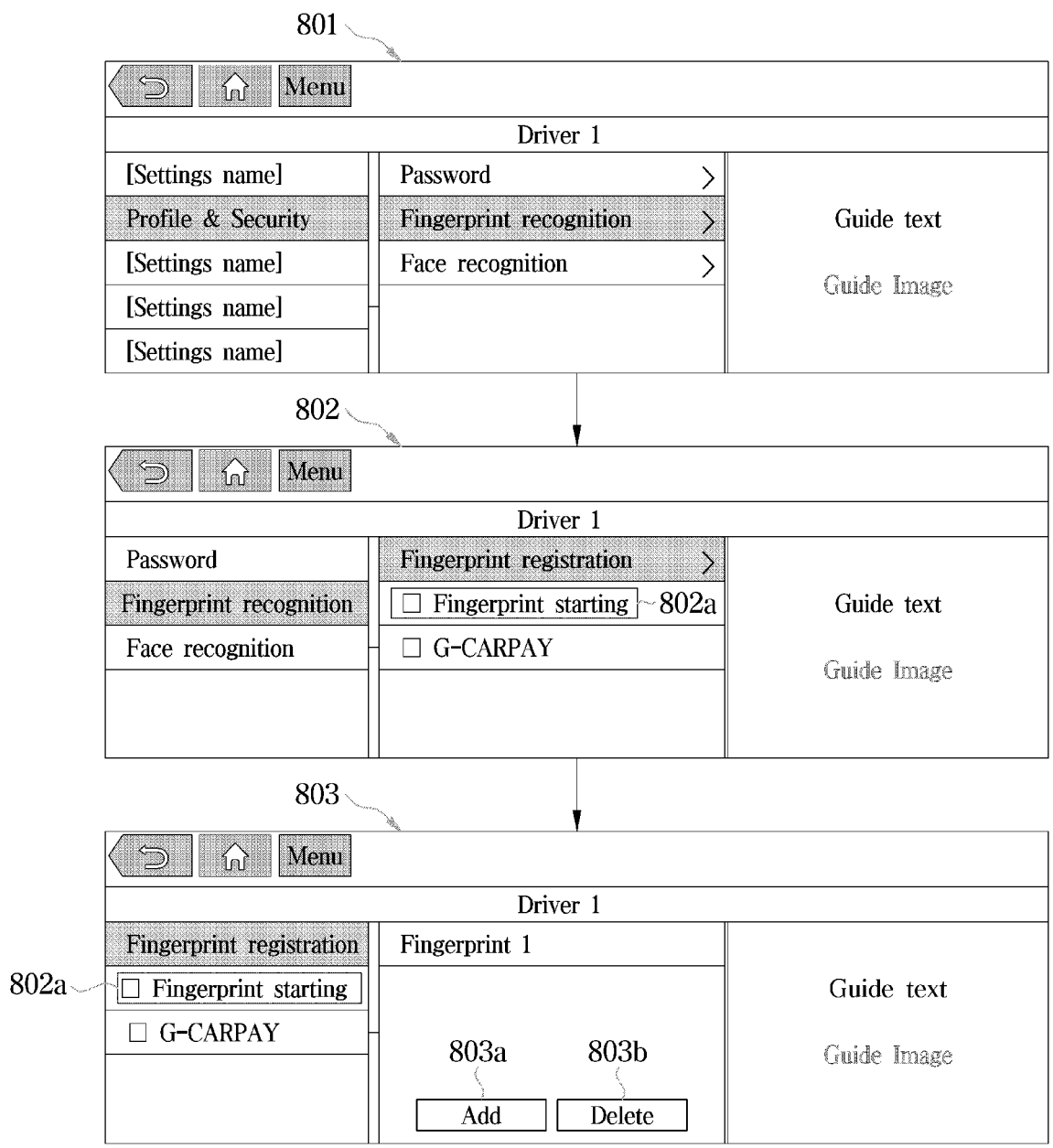
FIG. 8 illustrates an example in which a menu tree for fingerprint registration is displayed on the display device.

FIG. 8 illustrates an example in which a menu tree for fingerprint registration is displayed on the display device.

Referring to FIG. 8, a menu tree for fingerprint registration may be sequentially displayed on the display device 140 in response to a user input. The menu tree for fingerprint registration may be referred to as a fingerprint setting menu. For example, a fourth screen 801, a fifth screen 802, and a sixth screen 803 may be sequentially displayed in response to a user input. When the user selects 'fingerprint recognition' on the fourth screen 801, the fifth screen 802 including a fingerprint starting 802*a* and G-CARPAY may be displayed on the display device 140 as a submenu related to fingerprint recognition. Also, when the user selects 'fingerprint registration', the sixth screen 803 including an Add button 803*a* capable of inputting the fingerprint registration command and a Delete button 803*b* capable of inputting the fingerprint information deletion command may be displayed on the display device 140.

The controller 200 may activate the fingerprint starting function or inactivate the fingerprint starting function based on a user input for the object of the fingerprint starting 802*a*. A color and/or shape of a check box in the fingerprint starting 802*a* item may be changed depending on the activation or inactivation of the fingerprint starting function.

Figure 9:
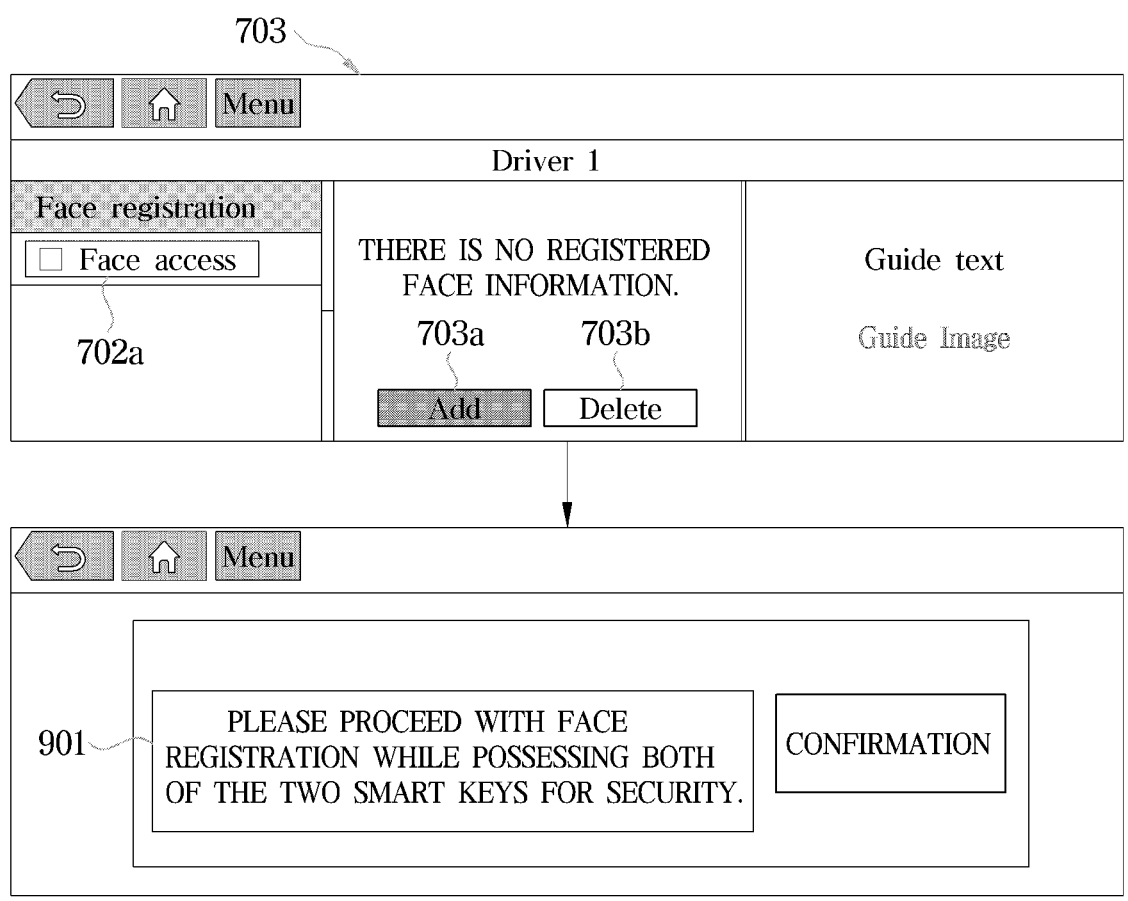
FIG. 9 illustrates an example of a screen for receiving a command for executing a face registration process and a screen on which a first guide message instructing possession of a smart key is displayed.

FIG. 9 illustrates an example of a screen for receiving a command for executing a face registration process and a screen on which a first guide message instructing possession of a smart key is displayed.

Referring to FIG. 9, when a user input pressing or clicking the Add button 703*a* is received on the third screen 703 in FIG. 7, the controller 200 may receive the first command (face registration command) for executing the face registration process.

The controller 200 may determine whether to proceed with the face registration process based on the number of the smart keys 20 detected by the smart key identifying device 120. The controller 200 may control the display device 140 to output the first guide message 901 instructing to possess a plurality of the smart keys 20 based on the detection of the single smart key 20 or the detection failure of the smart key. The first guide message 901 may be displayed as a text such as 'Please proceed with face registration while possessing both of the two smart keys for security'.

Figure 10:
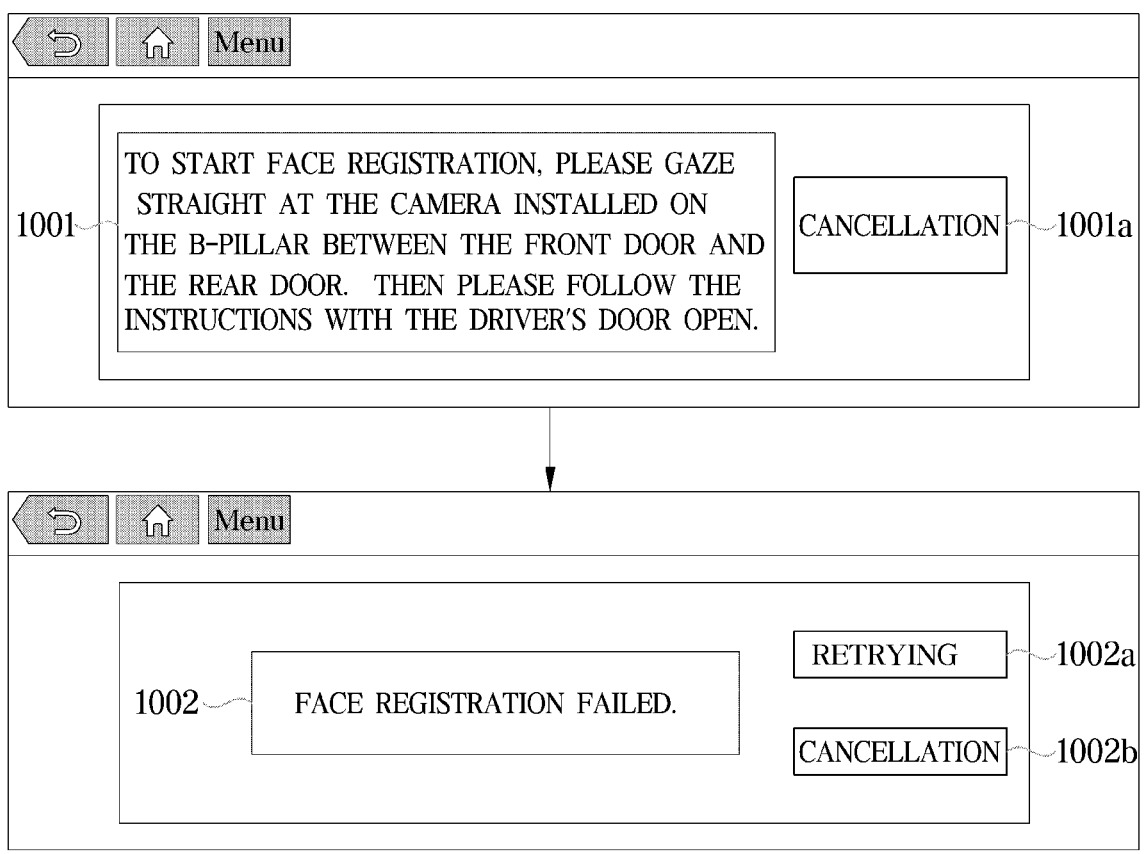
FIG. 10 illustrates an example of a screen on which a second guide message instructing a user action required to proceed with the face registration process is displayed and a screen on which a face registration failure message is displayed.

FIG. 10 illustrates an example of a screen on which a second guide message instructing a user action required to proceed with the face registration process is displayed and a screen on which a face registration failure message is displayed.

Referring to FIG. 10, the controller 200 may control the display device 140 to output the second guide message 1001 instructing the user action required to proceed with the face registration process based on the detection of the plurality of the smart keys 20. The second guide message 1001 may be displayed as texts such as 'To start face registration, please gaze straight at the camera installed on the B-pillar between the front door and the rear door. Then please follow the instructions with the driver's door open'. When the user presses or clicks a cancellation button 1001*a*, the controller 200 may cancel the face registration process.

The controller 200 may execute the face registration process in response to the user action. For example, the user action may include the movement of the user to position the face of the user within the angle of view of the camera 130. When the face image of the user is obtained by the camera 130, the controller 200 may proceed with the face registration process. The controller 200 may control the camera 130 to obtain the face image of user after outputting the second guide message.

When obtainment of the face image fails, a face registration failure message 1002 may be output on the display device 140. The face registration failure message 1002 may be displayed as a text such as 'Face registration failed'. When the user presses or clicks a retrying button 1002*a*, the controller 200 may retry obtainment of the face image. When the user presses or clicks a cancellation button 1002*b*, the controller 200 may cancel the face registration process.

Figure 11:
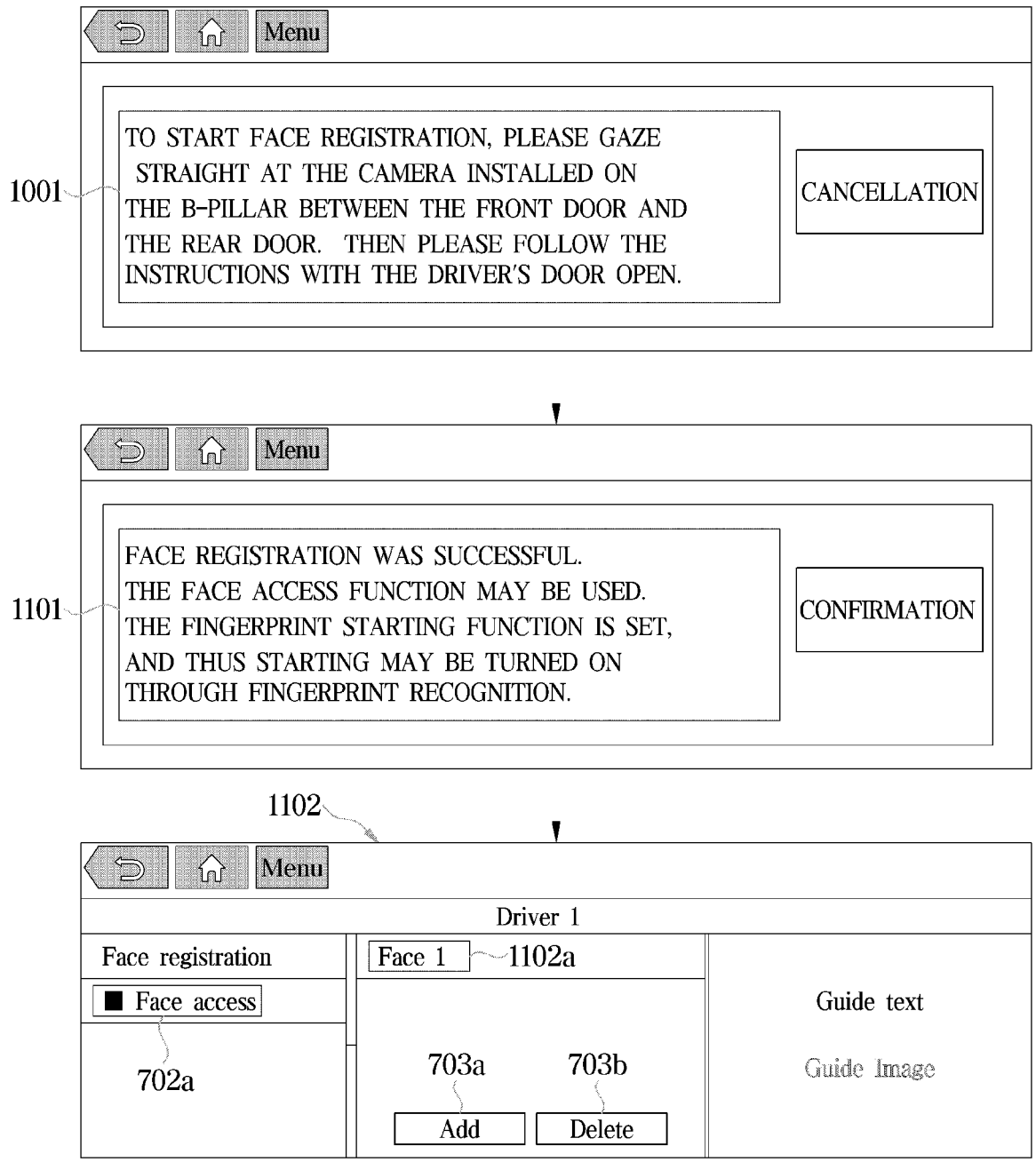
FIG. 11 illustrates an example of a screen on which a third guide message notifying that a face access function and a fingerprint starting function are available is displayed and a screen on which the registered face information is displayed, when the face registration is successful.

FIG. 11 illustrates an example of a screen on which a third guide message notifying that a face access function and a fingerprint starting function are available is displayed and a screen on which the registered face information is displayed, when the face registration is successful.

Referring to FIG. 11, when the face image is successfully obtained by the camera 130 after the second guide message 1001 is output, the controller 200 may activate the face access function and may identify whether the fingerprint starting function is activated.

The controller 200 may control the display device 140 to output the third guide message 1101 notifying that the face access function and the fingerprint starting function are available based on the activated state of the fingerprint starting function after the face access function is activated. The third guide message 1101 may be displayed as texts such as 'Face registration was successful. The face access function may be used. The fingerprint starting function is set, and thus starting may be turned on through fingerprint recognition'.

Also, a seventh screen 1102 including a list of the registered face information 1102*a* and the face access 702*a* object indicating an activated state of the face access function may be displayed on the display device 140.

Figure 12:
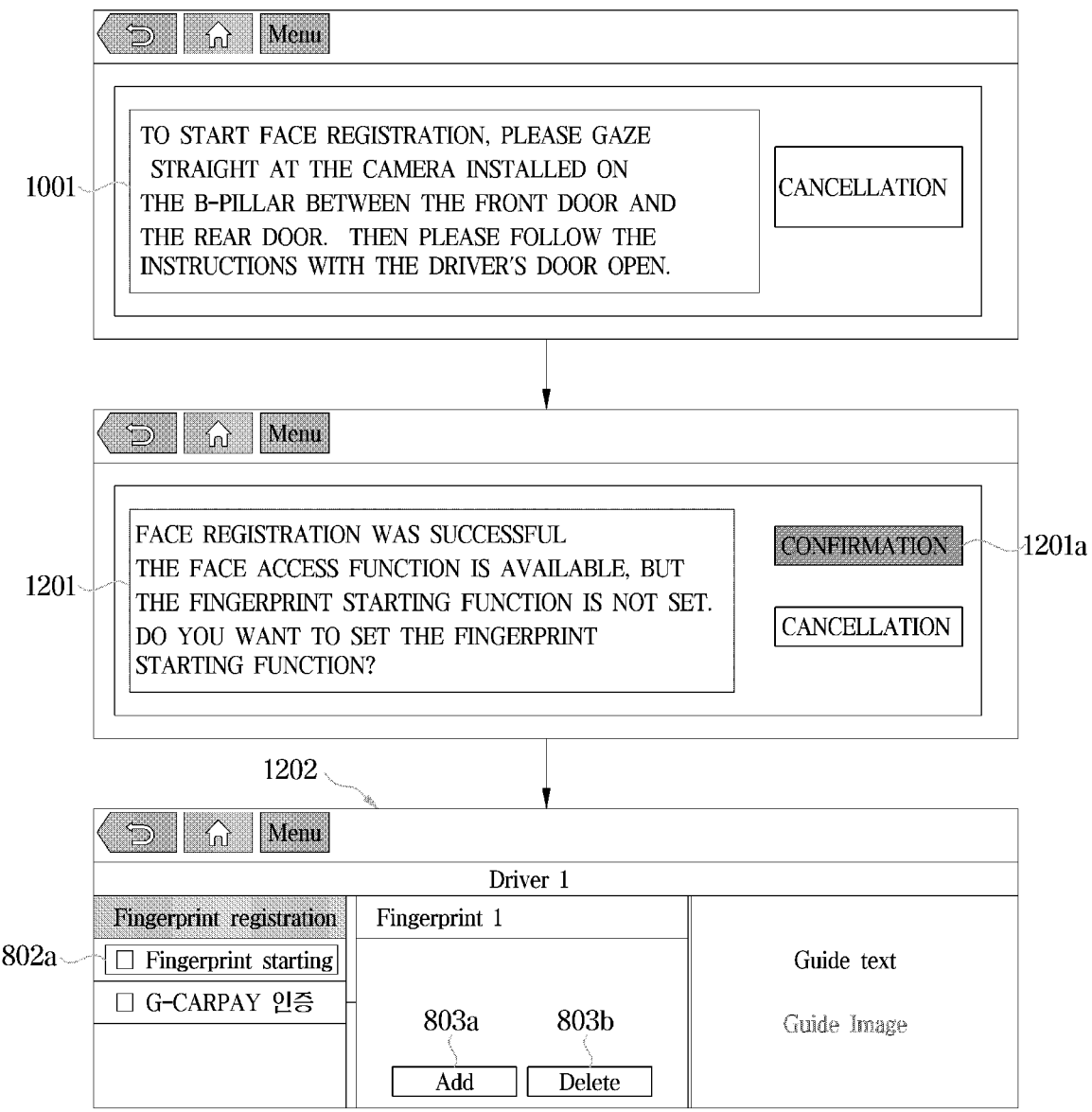
FIG. 12 illustrates an example of a screen on which a fourth guide message guiding setting of the fingerprint starting function is displayed and a screen on which a fingerprint setting menu is displayed, when the face registration is successful.

FIG. 12 illustrates an example of a screen on which a fourth guide message guiding setting of the fingerprint starting function is displayed and a screen on which a fingerprint setting menu is displayed, when the face registration is successful.

Referring to FIG. 12, when the face image is successfully obtained by the camera 130 after the output of the second guide message 1001, the controller 200 may activate the face access function and may identify whether the fingerprint starting function is activated. The controller 200 may control the display device 140 to output the fourth guide message 1201 guiding a setting of the fingerprint starting function based on the inactivated state of the fingerprint starting function after the face access function is activated. The fourth guide message 1201 may be displayed as texts such as 'Face registration was successful. The face access function is available, but the fingerprint starting function is not set. Do you want to set the fingerprint starting function?'.

Based on the reception of the setting start command of the fingerprint starting function through the input device 150 after the fourth guide message 1201 is output, the controller 200 may control the display device 140 to display a fingerprint setting menu. When the user presses or clicks a confirmation button 1201*a*, the setting start command of the fingerprint starting function may be input, and an eighth screen 1202 including a fingerprint starting 802*a* object indicating an inactivated state may be displayed on the display device 140. The user may activate the fingerprint starting function by pressing or clicking the fingerprint starting 802*a* object.

Figure 13:
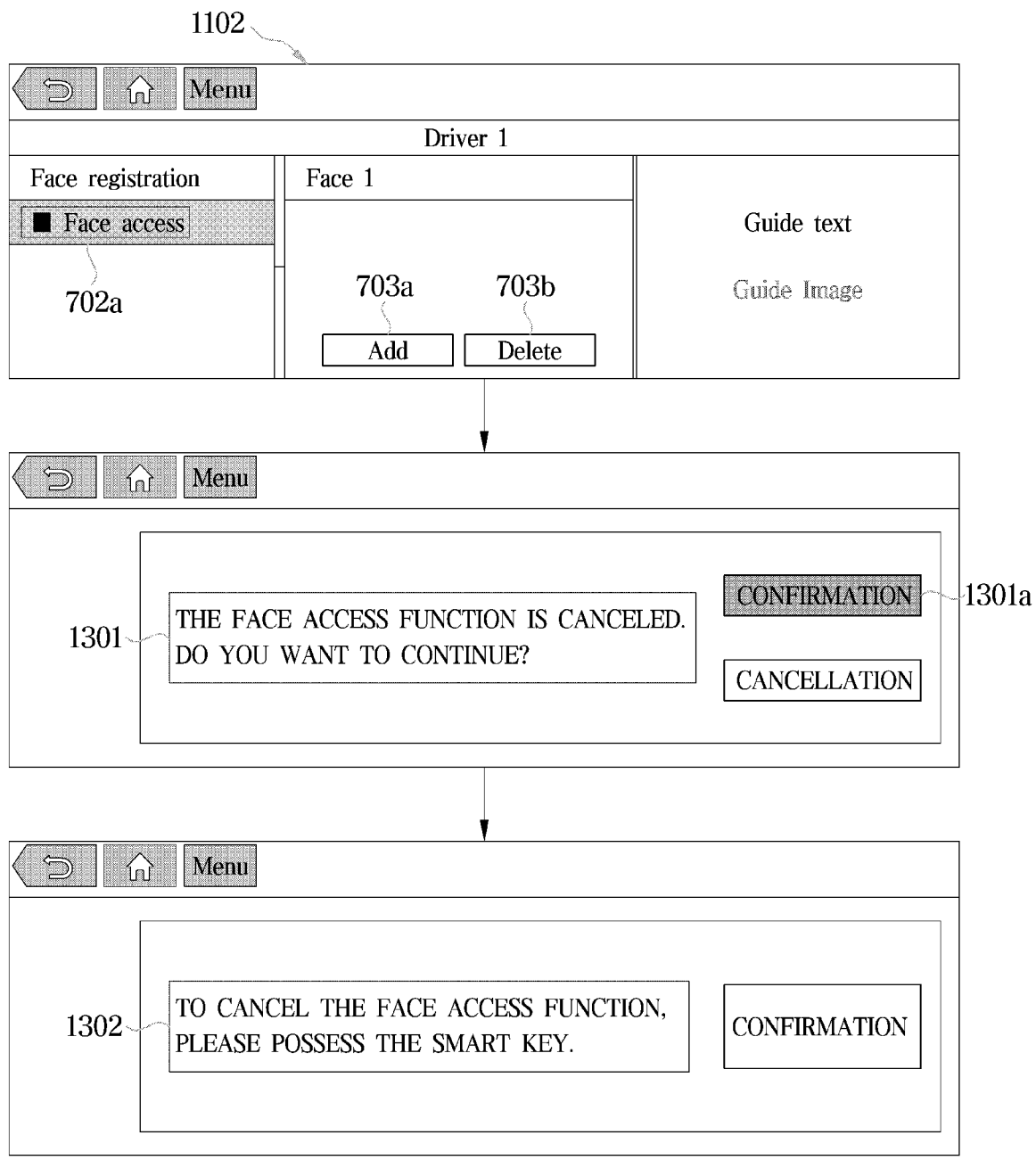
FIG. 13 illustrates an example of a screen on which a query message regarding whether to execute a command is displayed and a screen on which a pop-up message instructing possession of the smart key is displayed, when the command to inactivate the face access function is input.

FIG. 13 illustrates an example of a screen on which a query message regarding whether to execute a command is displayed and a screen on which a pop-up message instructing possession of the smart key is displayed, when the command to inactivate the face access function is input.

Referring to FIG. 13, the controller 200 may receive the inactivation command of the face access function through the input device 150. In the seventh screen 1102 including the list of the registered face information 1102*a* and the face access 702*a* object indicating the activated state of the face access function, when the user presses or clicks the face access 702*a* object, the command to inactivate the face access function may be input.

The controller 200 may control the display device 140 to output a query message 1301 regarding whether the command is executed in response to the command to inactivate the face access function. The query message 1301 may be displayed as texts such as 'The face access function is canceled. Do you want to continue?' When the user presses or clicks the confirmation button 1301*a*, the face access function may proceed to be inactivated.

The controller 200 may control the smart key identifying device 120 to search for the smart key 20 located inside the vehicle 1 based on the inactivation command of the face access function. The controller 200 may control the display device 140 to output a pop-up message 1302 instructing possession of the smart key 20 based on the detection failure of the smart key 20. The pop-up message 1302 may be displayed as a text such as 'To cancel the face access function, please possess the smart key'.

Figure 14:
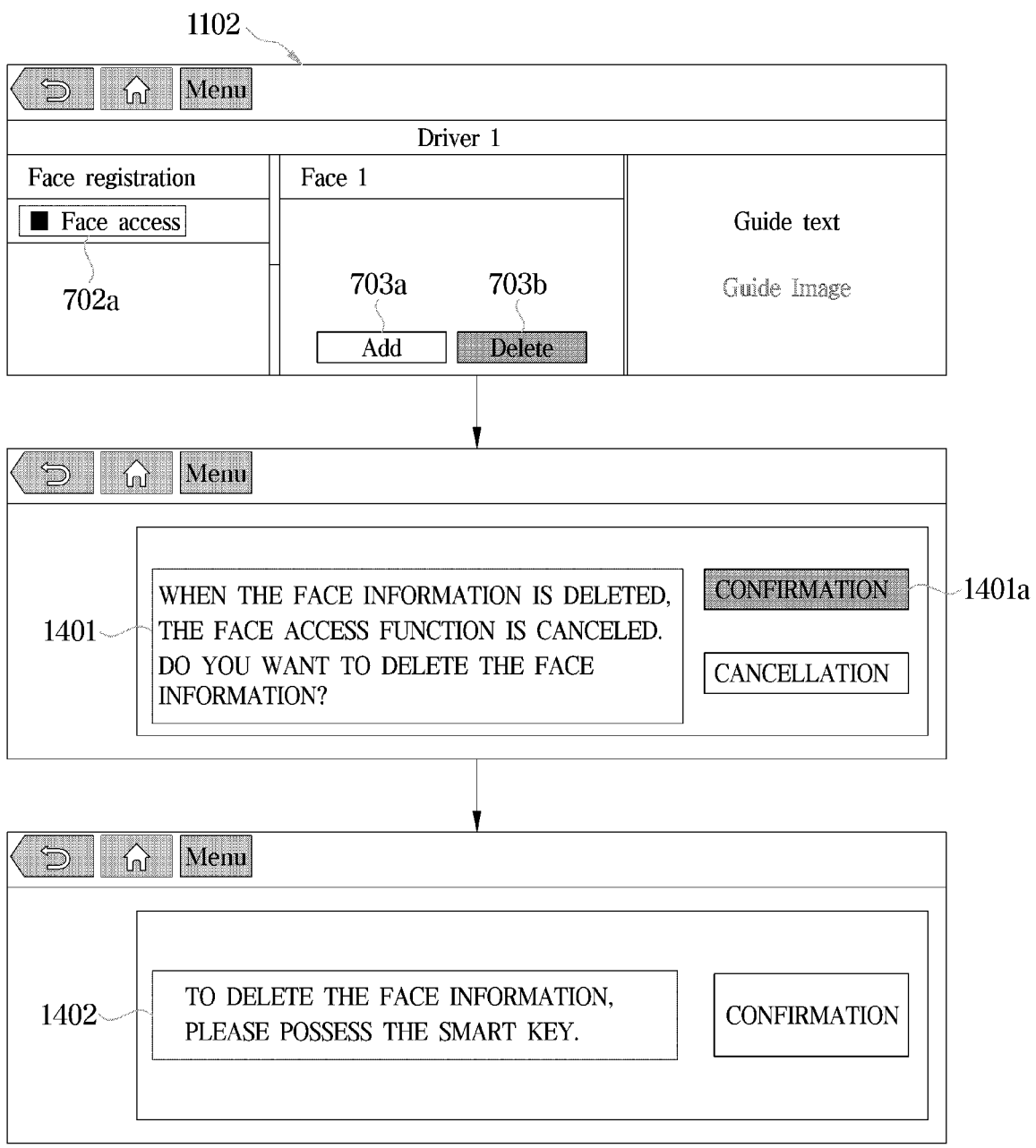
FIG. 14 illustrates an example of a screen on which a query message regarding whether to execute a command is displayed and the screen on which the pop-up message instructing possession of the smart key is displayed, when the command to delete the face information is input.
Figure 15:
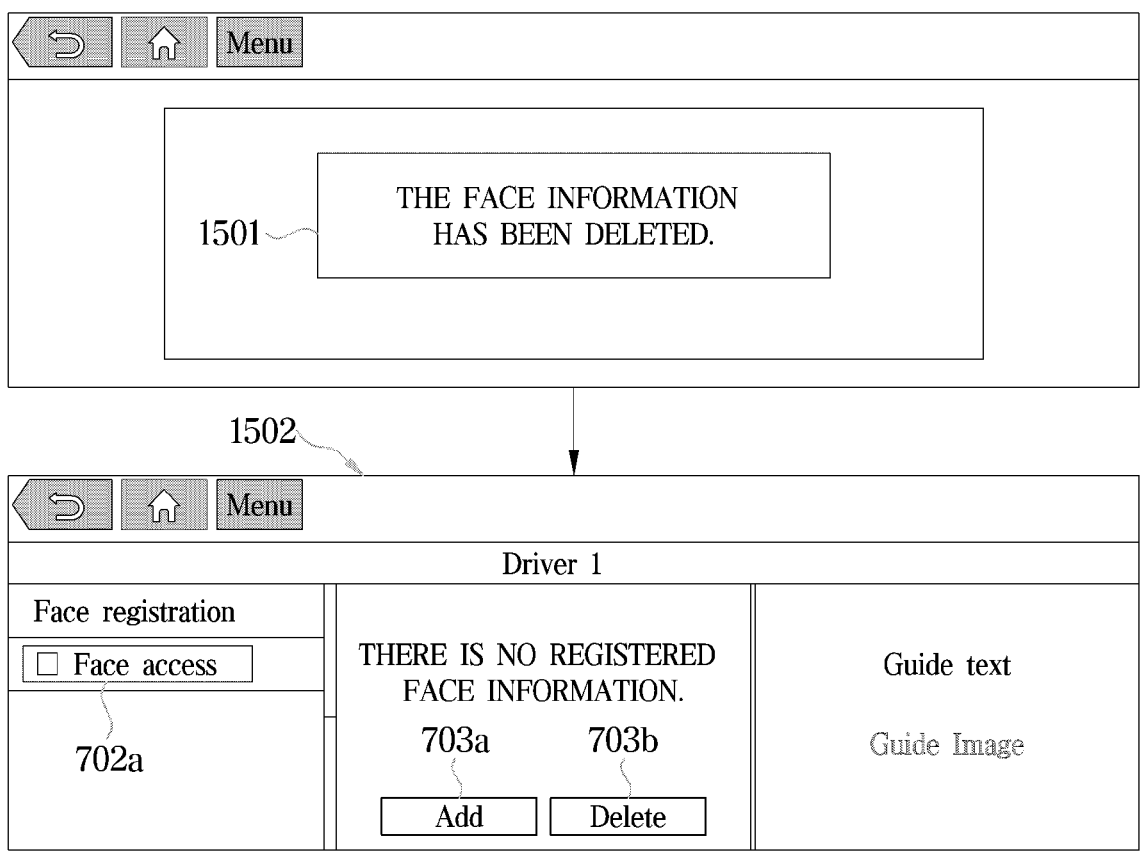
FIG. 15 illustrates an example of a screen on which a deletion completion message of the face information is displayed and a screen on which a face registration menu is displayed.

FIG. 14 illustrates an example of a screen on which a query message regarding whether to execute a command is displayed and the screen on which the pop-up message instructing possession of the smart key is displayed, when the command to delete the face information is input, and FIG. 15 illustrates an example of a screen on which a deletion completion message of the face information is displayed and a screen on which a face registration menu is displayed.

Referring to FIG. 14, the controller 200 may receive the face information deletion command through the input device 150. In the seventh screen 1102 including the list of the registered face information 1102*a* and the face access 702*a* object indicating the activated state of the face access function, when the user presses or clicks the delete button 703*b*, the face information deletion command may be input.

The controller 200 may control the display device 140 to output a query message 1401 regarding whether the command is executed in response to the face information deletion command. The query message 1401 may be displayed as texts such as 'When the face information is deleted, the face access function is canceled. Do you want to delete the face information?' When the user presses or clicks a confirmation button 1401*a*, the face information deletion process may proceed.

The controller 200 may control the smart key identifying device 120 to search for the smart key 20 located inside the vehicle 1 based on the face information deletion command. The controller 200 may control the display device 140 to output a pop-up message 1402 instructing possession of the smart key 20 based on the detection failure of the smart key 20. The pop-up message 1402 may be displayed as a text such as 'To delete the face information, please possess the smart key'.

Referring to FIG. 15, when the deletion of face information is completed, the controller 200 may control the display device 140 to display a face information deletion completion message 1501. The face information deletion completion message 1501 may be displayed as a text such as 'The face information has been deleted'. Also, a screen 1502 indicating that there is no face information registered after deletion of face information may be output to the display device 140. When the user presses or clicks the Add button 703*a* again, the face registration process may be performed.

As is apparent from the above, the disclosed embodiments of a vehicle and a control method thereof can prevent face information used for locking or unlocking the vehicle from being arbitrarily registered by another person other than an owner of the vehicle.

Further, the disclosed embodiments of a vehicle and the control method thereof can improve user convenience by providing a guide on a function of controlling starting of the vehicle using a fingerprint along with registration of the face information.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

The embodiments disclosed with reference to the accompanying drawings have been described above. However, those of ordinary skill in the art to which the disclosure belongs will understand that the disclosure may be implemented in a form different from the disclosed embodiments without changing the technical spirit or essential features of the disclosure. The disclosed embodiments are illustrative and should not be construed as limiting.

What is claimed is:

1. A vehicle comprising:
   a display device;
   an input device;
   a smart key identifying device configured to search for a set of smart keys as being related to a specific vehicle; and
   a controller electrically connected to the display device, the input device, and the smart key identifying device, wherein the controller is configured to:
   control the smart key identifying device to search for the set of smart keys located inside the vehicle based on receiving a first command for executing a face registration process through the input device; and
   determine whether to proceed with the face registration process based on how many keys of the set of smart keys are identified as being inside the vehicle.

2. The vehicle according to claim 1, wherein the controller is configured to control the display device to output a first guide message instructing to possess the set of smart keys based on a detection of a single one of the keys of the set of smart keys or a detection failure of the smart key.

3. The vehicle according to claim 2, wherein the controller is configured to:
control the display device to output a second guide message instructing a user action required to proceed with the face registration process based on a detection of each of the set of smart keys; and
execute the face registration process in response to the user action.

4. The vehicle according to claim 3, further comprising:
a memory; and
a camera provided on a door and configured to photograph an exterior of the vehicle, wherein the controller is configured to:
control the camera to obtain a face image of a user after outputting the second guide message;
store the obtained face image of the user in the memory; and
activate a face access function using the face image.

5. The vehicle according to claim 4, wherein the controller is configured to control the display device to output a failure message of the face registration based on a failure to obtain the face image.

6. The vehicle according to claim 4, wherein the controller is configured to:
control the display device to output a third guide message notifying that the face access function and a fingerprint starting function are available based on an activated state of the fingerprint starting function after the face access function is activated; or
control the display device to output a fourth guide message guiding a setting of the fingerprint starting function based on an inactivated state of the fingerprint starting function after the face access function is activated.

7. The vehicle according to claim 6, wherein the controller is configured to control the display device to display a fingerprint setting menu based on receiving a setting start command of the fingerprint starting function through the input device after the fourth guide message is output.

8. The vehicle according to claim 4, wherein the controller is configured to:
control the smart key identifying device to search for the smart key located inside the vehicle based on receiving a command to inactivate the face access function or a command to delete registered face information; and
inactivate the face access function based on a detection of the smart key.

9. The vehicle according to claim 8, wherein the controller is configured to control the display device to output a pop-up message instructing possession of the smart key based on the detection failure of the smart key after receiving the command to inactivate the face access function or the command to delete the registered face information.

10. The vehicle according to claim 8, wherein the controller is configured to control the display device to output a query message regarding whether to execute the command in response to reception of the command to inactivate or the command to delete.

11. A method of controlling a vehicle, the method comprising:
receiving a first command for executing a face registration process through an input device;
searching for a set of smart keys as being related to the specific vehicle located inside the vehicle based on the first command; and
determining whether to proceed with the face registration process based on how many keys of the set of smart keys are identified as being located inside the vehicle.

12. The method according to claim 11, wherein determining whether to proceed with the face registration process comprises outputting a first guide message instructing to possess the set of smart keys through a display device based on a detection of a single one of the keys of the set of smart keys or a detection failure of the smart key.

13. The method according to claim 12, wherein determining whether to proceed with the face registration process comprises:
outputting a second guide message instructing a user action required to proceed with the face registration process through the display device based on a detection of each key of the set of smart keys; and
executing the face registration process in response to the user action.

14. The method according to claim 13, wherein executing the face registration process comprises:
obtaining a face image of a user using a camera after outputting the second guide message;
storing the obtained face image of the user in a memory; and
activating a face access function using the face image.

15. The method according to claim 14, wherein obtaining the face image of the user comprises outputting a failure message of the face registration through the display device based on a failure to obtain the face image.

16. The method according to claim 14, further comprising:
outputting a third guide message notifying that the face access function and a fingerprint starting function are available based on an activated state of the fingerprint starting function after the face access function is activated; or
outputting a fourth guide message guiding a setting of the fingerprint starting function through the display device based on an inactivated state of the fingerprint starting function after the face access function is activated.

17. The method according to claim 16, further comprising displaying a fingerprint setting menu through the display device based on receiving a setting start command of the fingerprint starting function through the input device after the fourth guide message is output.

18. The method according to claim 14, further comprising:
searching for the smart key located inside the vehicle based on receiving a command to inactivate the face access function or a command to delete registered face information; and
inactivating the face access function based on a detection of the smart key.

19. The method according to claim 18, wherein searching for the smart key comprises outputting a pop-up message instructing possession of the smart key through the display device based on the detection failure of the smart key.

20. The method according to claim 18, further comprising outputting a query message regarding whether to execute the command through the display device in response to reception of the command to inactivate or the command to delete.

* * * * *